United States Patent
Anderson et al.

[11] 3,726,001
[45] Apr. 10, 1973

[54] QUICK CHANGE TOOLING

[75] Inventors: George B. Anderson, Rochester; Derek Aspin, Henrietta, both of N.Y.

[73] Assignee: USM Corporation, Rochester, N.Y.

[22] Filed: Feb. 18, 1971

[21] Appl. No.: 116,513

[52] U.S. Cl. ..................................29/568, 26/26 A
[51] Int. Cl. ...............................................B23q 3/155
[58] Field of Search............................29/568, 26 A

[56] References Cited

UNITED STATES PATENTS

| | | | |
|---|---|---|---|
| 3,460,412 | 8/1969 | Clausen et al. | 29/568 X |
| 3,286,595 | 11/1966 | Wollenhaupt | 29/568 X |
| 3,186,085 | 1/1965 | Coate | 29/568 |
| 2,323,010 | 6/1943 | Conradson | 29/568 X |

FOREIGN PATENTS OR APPLICATIONS 1,205,104  9/1970  Great Britain.........................29/568

*Primary Examiner*—Francis S. Husar
*Attorney*—Shlesinger, Fitzsimmons & Shlesinger

[57] ABSTRACT

A pair of tool blocks is mounted at opposite sides of the shank of each ram of a boring mill. Each tool block is formed with a tongue or projection that engages in a groove in the shank; and the two tool blocks are releasably held in place by clamps and a rotatable clamping bar. The clamping bar is basically cylindrical but has two axially spaced tongues projecting from its periphery, each extending part-way only around its periphery. The tongues locate the tool blocks laterally on the shank. The clamping bar transmits pressure from the clamps to the tool blocks to press the tool blocks against right angular shoulders that are formed on the ram shank to lock the tool blocks in position when the bolts, which secure the clamps to the ram shank, are threaded in to tighten the clamps against the tool blocks. Electrically-controlled hydraulic or pneumatic means are provided to rotate the clamping bar and the bolts to release the tool blocks or to clamp tool blocks in place.

10 Claims, 9 Drawing Figures

INVENTORS
GEORGE B. ANDERSON
DEREK ASPIN
BY
Shlesinger Fitzsimmons & Shlesinger
ATTORNEYS

INVENTORS
GEORGE B. ANDERSON
DEREK ASPIN

INVENTORS
GEORGE B. ANDERSON
DEREK ASPIN

QUICK CHANGE TOOLING

The present invention relates to tool holders, and more particularly to tool holders for vertical boring mills or similar machine tools. In a still more specific aspect, the invention relates to an improvement on the tool block disclosed in the pending application of George B. Anderson and Frederic William Young, Ser. No. 795,819, filed Feb. 3, 1969, and now U.S. Pat. No. 3,545,319.

Past practice has been to secure a tool block to the ram of a boring mill by bolts passing through the tool block and threading into the ram, or by clamps which engage over the tool block, or a part thereof, and which, in turn, are secured to the ram or other machine part. To remove the tool block from the ram, where the block is secured directly by bolts, the bolts have to be completely unthreaded. Where the block is secured in place by a clamp, that is fastened in clamping position by bolts, the bolts still have to be unthreaded before the tool block can be removed. To fasten a new tool block in place requires rethreading of the bolts in position. All this takes time; and a valuable machine is standing idle while the tools are being changed.

The tool block of prior application Ser. No. 795,819 mentioned above has a tongue or projection that engages in a groove of the tool slide, ram, shank, or other tool support of the machine, on which the tool is mounted; and it has a concave rear surface above the tongue or projection. It is releasably held in place by a clamp bar that has a cylindrical surface around part of its periphery, but is recessed around the rest of its periphery. A clamping member is secured by screws to the tool block, to hold the clamp bar against rotation when the clamp bar is in clamping position. When the cylindrical portion of the periphery of the clamp bar seats on the concave rear surface of the tool block and the screws are tightened to tighten the clamping member on the clamp bar, the clamp bar by its engagement with said concave surface, locks the tool block securely in place. By loosening the bolts slightly, the clamp bar can be manually rotated to bring its recess into registry with the concave surface of the tool block to release the tool block.

However, with the construction of the prior application mentioned, it is still necessary to manually release the bolts and to manually rotate the clamping bar to release the tool block, and, when a new tool block carrying a new tool has been put in position, to reverse these operations manually.

The primary object of the present invention is to provide means for effecting faster tool changing operations than those heretofore achievable. To this end it is a purpose of the invention to provide improved means for quickly moving the clamping bar to released position, and for quickly releasing the locking bolts or screws, when it is desired to remove a tool block from a machine, and to provide for quickly and securely moving the clamping bar to clamping position, and for quickly and securely moving the screws or bolts themselves to clamping position again, when it is desired to secure a tool block in place on this machine.

Other objects of the invention will be apparent hereinafter from the specification and from the recital of the appended claims, particularly when read in conjunction with the accompanying drawings.

Figure 1:
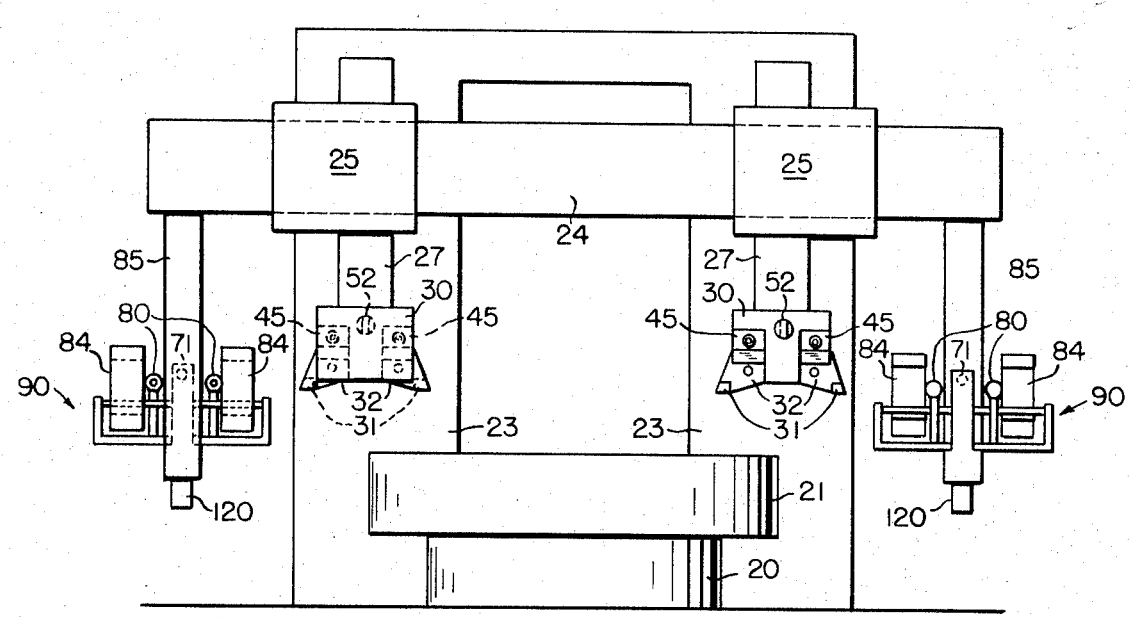
FIG. 1 is a side elevation, with parts broken away, showing a vertical boring mill equipped with tool blocks made according to one embodiment of this invention.

Referring now to the drawings by numerals of reference, 20 (FIGS. 1 and 9) denotes the base of a boring mill, on which the tool changer of this invention is used. 21 designates the table of the boring mill, 23 (FIG. 1) the uprights of the machine, 24 the crossrail, 25 the saddles which are slidable on the crossrail, and 27 the rams which are carried by the two saddles, respectively. Each ram 27 carries a shank or support 30 to which two tool blocks 32 are secured. Each block has a tool bit 31 fastened to it in any conventional, or suitable manner. The supports 30 face in opposite directions at opposite sides, respectively, of table 21, so that the bits 31 at one side of the table face in a direction opposite to those at the opposite side of the table in the usual manner.

All of the above is known construction and forms no part of the present invention. Each shank 30 has two spaced coplanar surfaces 34 on which the plane undersurfaces 35 (FIG. 3) of the tool blocks 32 are adapted to seat.

Each shank 30 also has in opposite ends thereof two spaced, aligned grooves 33, which are adapted slidably to receive the tongues 36 of the two associated tool blocks 32. Each tongue has a plane lower face 37, a plane upper surface 38 and a plane side face 39. The upper face 38 is inclined and converges toward the lower face 37 approaching side face 39. The grooves 33 are shaped in correspondence with the tongues 36 but are slightly wider than the tongues. The lower face 37 of the tongue of each tool block is perpendicular to the two seating surfaces 34 and 35.

The plane lower surface 37 of each tongue is adapted to seat against the lower plane side 40 of the groove, which is at right angles to surface 34. The plane upper surface 38 of the tongue terminates in an arcuate cylindrical surface 41, which has intermediate its ends an arcuate groove or keyway 41'. Surface 41 connects surface 38 with the plane surface 42 of the tongue which forms part of one side of the tongue. The rest of this side of the tongue comprises rib 43 and a surface 44 which is offset laterally from surface 42.

For securing each tool block to a shank 30, a clamp 45, a rotary pin or bar 46, and a clamp screw 48 are employed.

Figure 4:
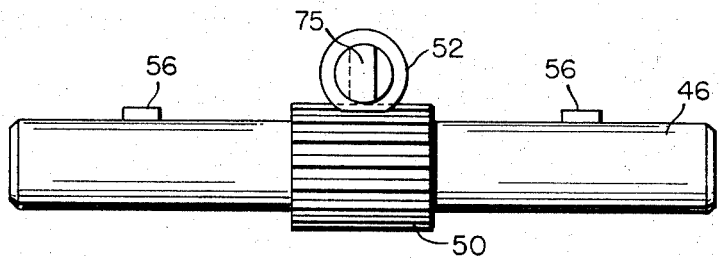
FIG. 4 is an elevation of the clamping bar and of the gearing for rotating the same.
Figure 5:
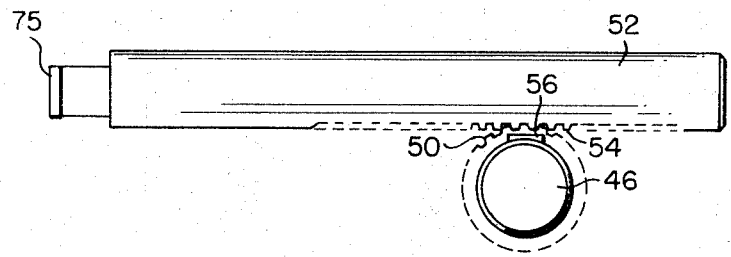
FIG. 5 is a view at right angles to the view of FIG. 4.

Each clamping pin 46 serves to hold the two tool blocks 32 of a ram in place. The clamping pin is formed intermediate its ends with a spur gear segment 50 (FIGS. 4 and 5) which is in mesh with the teeth of a rack bar 52, which has rack teeth 54 on its underside which engage the segment 50.

Each rack bar 52 is adapted to be reciprocated by operation of a piston 70 (FIG. 8), which is reciprocable in one of two cylinders 71 (FIGS. 6 and 8), which form part of tool changers 90 that are located adjacent opposite ends of cross-rail 24. Each piston 70 has a protruding portion 72 (FIG. 6) that is adapted to engage in a kerf 75 in the outer end of a bar 52. Movement of a piston 70 in one direction rotates the associated clamping pin 46 to released position, and movement of this piston in the opposite direction moves the clamping pin to its locking position.

At opposite sides of its segment 50, each pin or bar 46 is formed with tongues or keys 56. Each clamp 45 is formed with an internal arcuate surface 55 adapted to surround a portion of the associated clamping pin 46; and each tool block groove 33 has a concave arcuate surface 57 (FIG. 3) adapted to surround a further portion of the clamping pin 46 between the clamp surface 55 and the surface 41 on a tool block 32. Intermediate its ends each surface 57 has therein an arcuate keyway 57' disposed to accommodate one of the keys 56 on bar 46, when the latter is in its released position, and disposed also to register with the keyway 41' in one of the blocks 32, when the latter is fully seated in one of the shank grooves 33. The surfaces 55 are of the same curvature and radius as the cylindrical or peripheral surfaces of pins 46; but the radius of curvature of the arcuate surfaces 41 of the tool blocks is slightly less than that of the bars 46.

Figure 2:
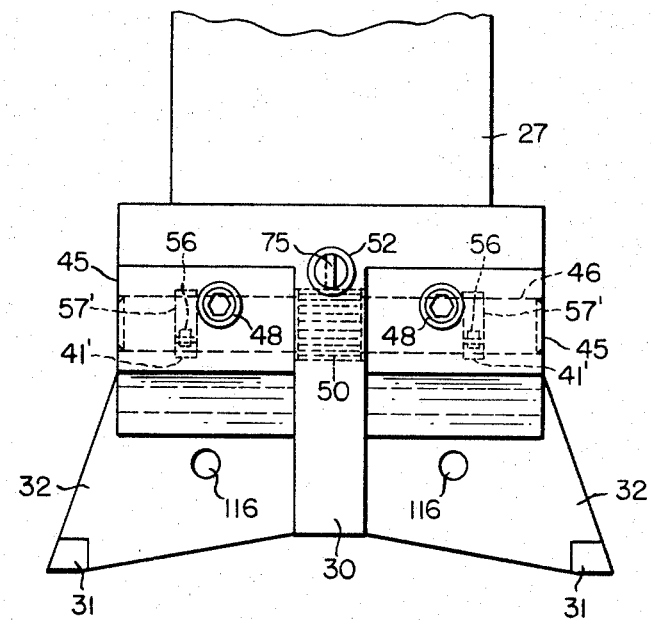
FIG. 2 is an enlarged fragmentary view showing a pair of tool blocks mounted on one of the rams of this machine.

When a pin 46 is in locking position (FIGS. 2 and 3), its keys 56 engage or extend into both of the registering keyways 41' and 57' in the tool blocks 32 and associated shank 30 to hold the tool blocks against lateral movement in the grooves 33 of the shank 30, while when the pin 46 is in its released, or other rotary position, its keys 56 are disengaged from the keyways 41' and are located entirely within the keyways 57', thereby to clear the tool blocks so that the tool blocks can be moved laterally out of or into the shank.

The two screws 48 used to clamp the clamps 45 to a shank 30, and through pin 46 to clamp the associated tool blocks 32 in place, are rotated by two hydraulic motors 80 (FIGS. 6, 8 and 9), which drive wrenches 81 (FIG. 6) through combination rotary-reciprocable pistons 83 mounted in cylinders 82. Each motor 80, its cylinder 82, and its driver 81 are mounted on a rigid bracket 96 (FIGS. 6 and 9) carried on the upper end of a column 85, which forms part of the frame of each tool changer 90.

Figure 3:
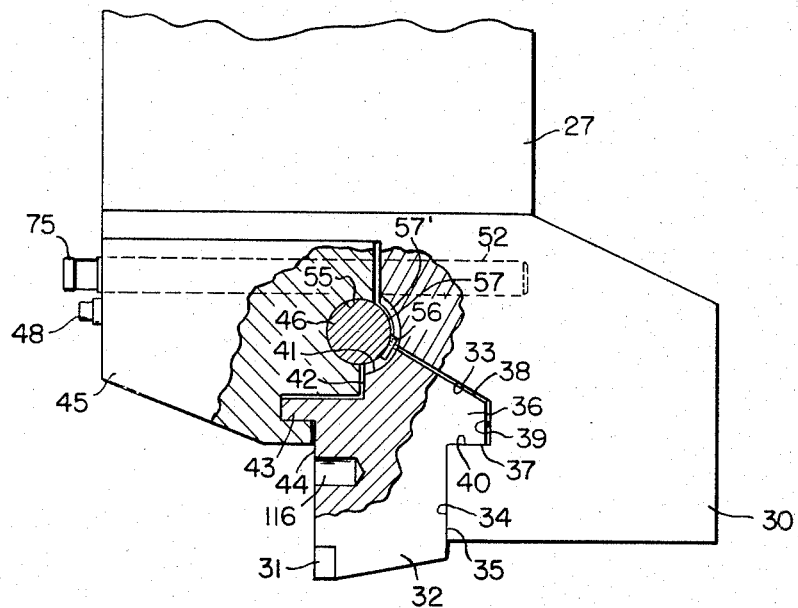
FIG. 3 is a fragmentary part sectional, part elevational view showing a tool block and the means for securing this block in position on the ram.

When a clamping pin 46 is in the position shown in FIG. 3, and the clamp screws 48 are tightened up, the pressure exerted by clamp surfaces 55 on the pin 46 causes the arcuate surfaces of the pin to be forced against the arcuate surfaces 41 on the tool blocks 32, whereby the tool blocks 32 are forced generally diagonally downwardly (FIG. 3) to urge the bottom surfaces 37 of the tongues 38 of the tool blocks against the sides 40 of the grooves 33, and to force the surfaces 35 of the tool blocks onto their seats 34, thus to seat the two tool blocks firmly and securely against the right-angular surfaces 34 and 40. There is a slight clearance (exaggerated in FIG. 3) between the remaining confronting surfaces of the shank 30, and the block 32, bar 46 and clamp 45, so that there will be no interference with the proper seating of surfaces 35 and 37 against surfaces 34 and 40.

To remove the tool blocks from the machine and to substitute other tool blocks, it is not necessary to remove the clamps 45, but only to loosen the screws 48 slightly (about one-half a turn) to release pin 46 from clamping engagement with surfaces 41, and to rotate the clamp pin 46 (about one-fourth a turn) to disengage the keys 56 (FIGS. 2 and 3) from keyways 41'.

When the clamps 45 are released, the keys 56 can be engaged in the keyways 41' of the tool blocks to hold the tool blocks on the tool holder.

Figure 8:
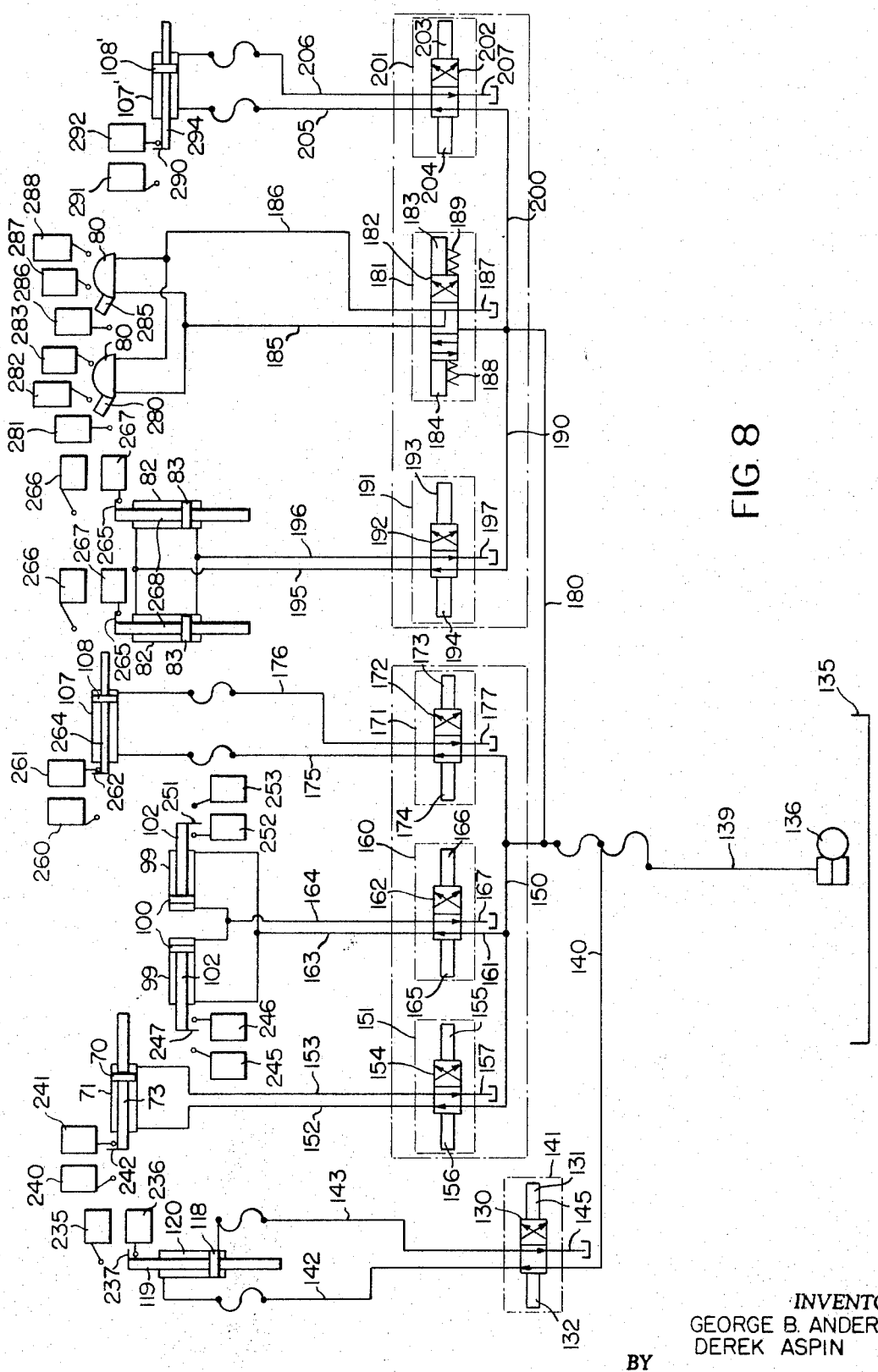
FIG. 8 is a diagram illustrating how the various hydraulically operated parts may be connected to perform their functions.

Movement of the clamping pin 46 to and from clamping position is achieved by movement of the rack bar 52 (FIGS. 4 and 5) through reciprocation of the piston 70 (FIG. 8). Movement of the screws 48 to and from clamping position is effected by operation of the motors 80 (FIGS. 6 and 8).

The tool changing operation is effected automatically.

For this purpose, the boring mill rams 27 (FIG. 1) with the shanks 30 are brought into registry with the tool changers 90.

Figure 6:
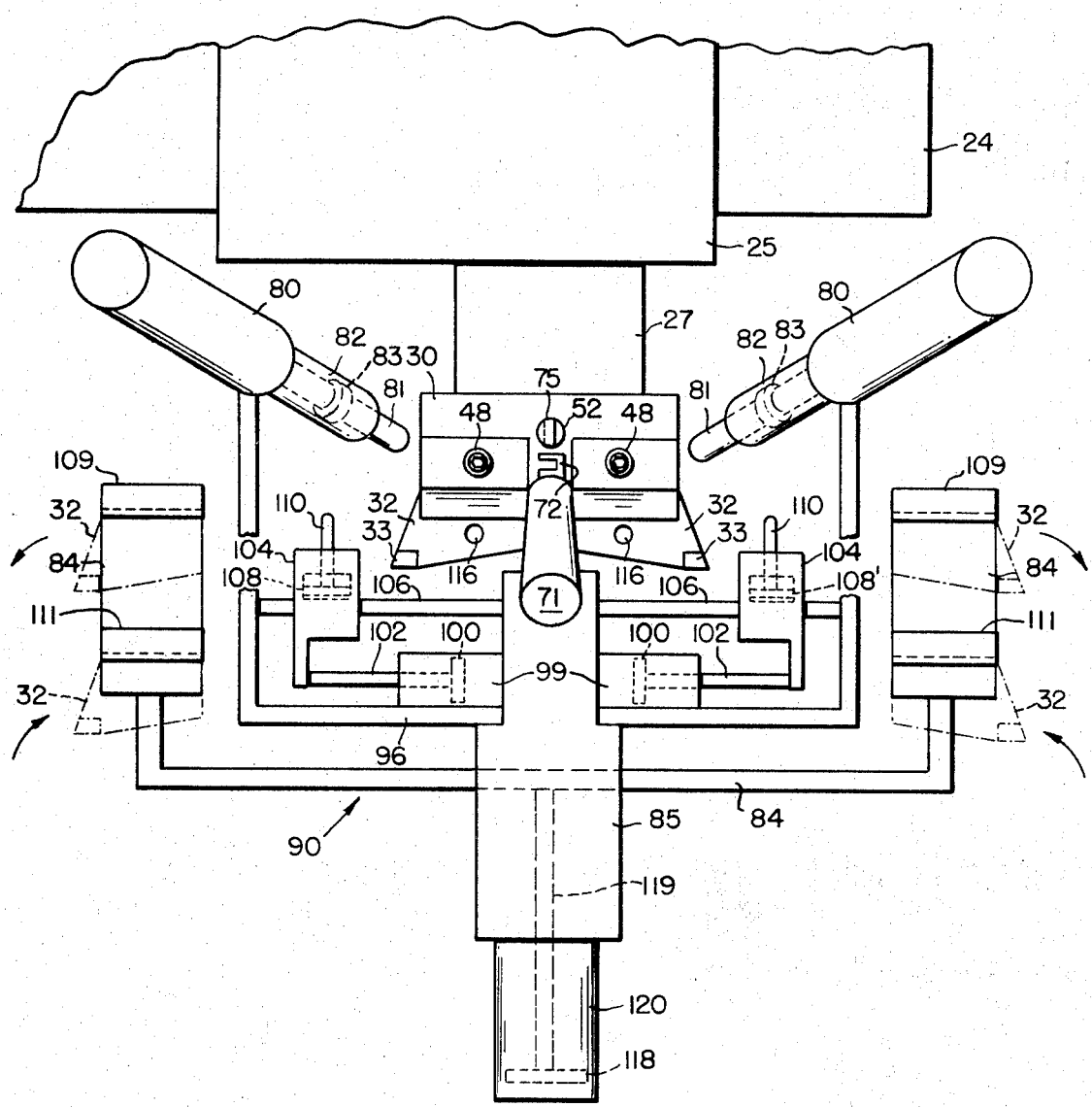
FIG. 6 is a diagrammatic view illustrating schematically the means for effecting a tool-changing operation.

Mounted on the rigid bracket 96 which forms part of the frame of each tool changer 90 are two cylinders 99 (FIGS. 6 and 8). A piston 100 (FIG. 8) is reciprocable in each cylinder 99. Each piston 100 is connected by a piston rod 102 with one of two transport blocks 104 that are mounted to slide on bars 106 (FIGS. 6 and 9), which are carried by the bracket 96.

Figure 9:
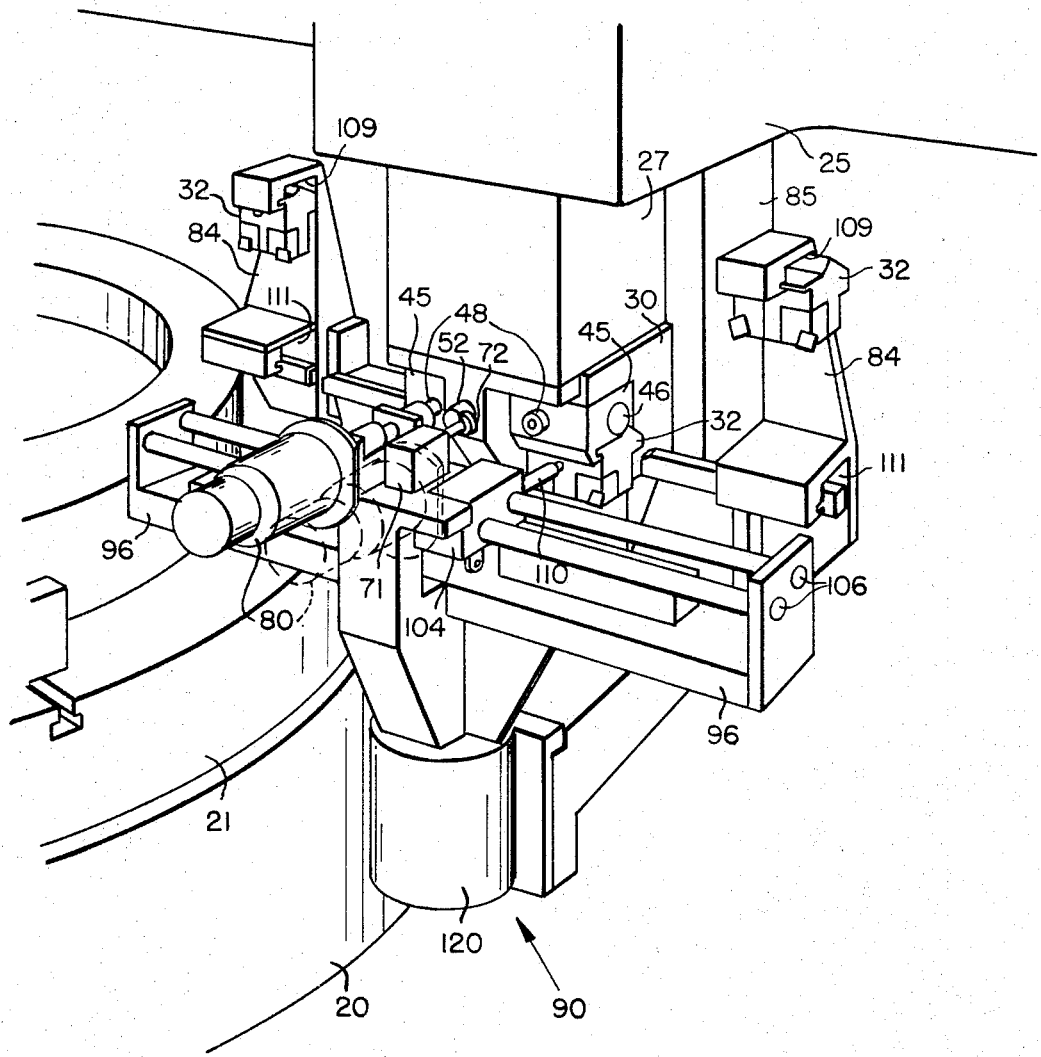
FIG. 9 is a fragmentary perspective view illustrating in greater detail one of the rams and its associated tool-changing means made in accordance with this invention; part only of one of the tool clamping drives being illustrated in phantom for purposes of clarity.

Pistons 108, 108' (FIGS. 6 and 8) are reciprocable in cylinders 107, 107' (FIG. 8) in the transport blocks 104. Secured to each piston 108, 108' and projecting outwardly from the associated transport block is a transport finger 110 (FIGS. 6 and 9).

Also mounted on the bracket 96 is the cylinder 71, which carries the piston that operates the rack bar 52.

A two-armed carriage 84 is mounted to reciprocate vertically on the frame of each tool changer 90. Mounted on the outer end of each arm of carriage 84 are two, vertically spaced pockets 109 and 111 for receiving worn (used) and new tools, respectively. Each carriage 84 is connected to a piston rod 119 for reciprocation vertically by a piston 118 (FIGS. 6 and 8) contained in a cylinder 120 that is rigid with column 85 and bracket 96.

After a boring operation is completed, and assuming the carriages 84 are in their lower positions (FIG. 6), each boring mill ram 27 with its shank 30 is moved on the crossrail 24 to bring its shank into registry with the associated tool changer 90. In this position the shank 30 will be disposed between opposite ends of the associated carriage 84 so that each of its blocks 32 will register with one of the pockets 109 as shown in FIG. 6. The hydraulic motors 80 (FIGS. 6 and 8) are then actuated, and the sockets or wrenches 81 are moved forward by the pistons 83 (FIGS. 6 and 8) in cylinders 82 to engage the clamp screws 48, and to rotate the clamp screws just enough to release the grip of the clamps on the tool blocks.

The piston 70 in each cylinder 71 then moves the associated rack bar 52 (FIGS. 4 and 5) in a direction to rotate associated pinion 50 and pin 46 to a position to release the tool blocks by disengaging the keys 56 from keyways 41'.

The transport fingers 110 (FIG. 6) are then moved forward by the pistons 108, 108' and enter the holes 116 (FIGS. 2 and 6) in the tool blocks 32. When the transport pins are engaged in these holes, the transport blocks are pushed away from one another by the pistons 100 to transport the tools out of the open ends of the grooves 33 in the shank, and into the registering pockets 109 (FIG. 6) in carriage 84. The transport fingers 110 are then retracted by the pistons 108, 108' so that the used tool blocks are carried now by carriages 84, as illustrated in phantom by broken lines in FIG. 6.

The carriages 84 are now raised vertically by means of associated pistons 118 in cylinders 120 until loaded pockets 111 in each carriage register with the now empty grooves 33 in the shanks 30; and until the holes 116 in the new tool blocks in the pockets 111 register with the associated transport pins 110. The pins 110 are then actuated to bring them into engagement with the new tool blocks; and then the pins and new tool blocks are advanced toward one another to position the new tool blocks on the shanks 27. The piston 70 in each cylinder 71 then pushes the associated rack bar 52 causing its pinion 50 to be rotated back to its original position to turn the associated pin 46 into locking engagement with the tool blocks, and to engage the keys 56 with the keyways 41' therein. The wrenches 81 now turn in reverse through operation of the hydraulic motors 80, thus clamping the new tool blocks to each shank in cutting position.

The wrenches 81 now retract or disengage; and the rams 27 move back for another cutting operation. The operator now takes the used tools out of each carriage 84, and loads two new tool blocks manually into the carriage for the next programmed tool change, as indicated by the arrows in FIG. 6.

One way in which the parts are a frame, hydraulically for operation is shown diagrammatically in FIG. 8, which illustrates the controls for one of the tool changers 90, it being understood that similar controls are employed for the other changer 90.

The position of the piston 118 (FIGS. 6 and 8) in the carriage cylinder 120 is controlled by slidable valve 130, which is moved in opposite directions by energizing solenoids 131 and 132, respectively.

The motive fluid for the hydraulic system is supplied by a conventional motor-driven pump 136 from a sump or reservoir 135 through a line 139 which is connected by line 140 with the housing 141 for valve 130. When this valve is in the position shown in FIG. 8, the motive fluid is supplied to the upper end of cylinder 120 through line 142 and exhausted from the lower end of this cylinder through line 143 to line 145 which goes back to the sump 135. At this time solenoid 131 is energized and solenoid 132 is deenergized. When solenoid 132 is energized, solenoid 131 is deenergized, and the valve 130 is shifted; and the lower end of cylinder 120 is put on supply while the upper end of this cylinder is put on exhaust. This reverses the position of piston 118, causing elevation of the associated tool carriage 84.

Line 139 is also connected by line 150 with the valve block 151 in which valve 154 slides. This valve is connected by lines 152 and 153 with opposite sides of the piston 70. Solenoids 155 and 156, when energized, shift the valve 154 in opposite directions. Line 157 connects the valve block 151 with the sump or reservoir 135.

The line 139 is also connected with a valve block 160 by line 150 and line 161. The valve 162 in this block controls the direction of movement of the pistons 100 in the cylinders 99. Lines 163 and 164 connect the valve block 160 with opposite ends, respectively, of the pistons 100. Valve 162 is moved in opposite directions by solenoids 165 and 166. Line 167 connects valve block 160 with the sump.

The line 139 is also connected with the valve block 171, in which the valve 172 is reciprocable. This valve is moved in opposite directions by the two solenoids 173 and 174, respectively. Valve block 171 is connected by line 175 with one end of the cylinder 107; and it is connected with the opposite end of the cylinder by line 176. Line 177 connects valve block 171 with the sump.

The line 139 is also connected by means of a line 180 with the valve block 181, in which the valve 182 is reciprocable by means of solenoids 183 and 184. Springs 188, 189 shift the valve spool 188 to centerport position when both solenoids 183 and 184 are deenergized. The valve block 181 is connected by lines 185 and 186 with opposite sides of the paddles or swash plates of the motors 80. The valve block 181 is connected with the reservoir or sump by the line 187.

The line 139 is also connected with a valve block 191 by lines 180 and 190. The valve 192, which is reciprocable in this block is moved in opposite directions by the solenoids 193 and 194, respectively. The valve block is connected by lines 195 and 196, with opposite sides of the pistons 83, which reciprocate in cylinders 82. Line 197 connects the valve block 191 with the reservoir or sump.

The supply line 139 is also connected with the valve block 201 by lines 180 and 200. The valve 202, which is reciprocable in this valve block, is moved in opposite directions by solenoids 203 and 204. The valve block is connected by lines 205 and 206, respectively, with opposite sides of the piston 108', which reciprocates in cylinder 107'. A line 207 connects the valve block 201 with the sump or reservoir.

A trip member 237 connected to the piston rod 119 of the piston 118 serves to trip limit switches 235 and 236, respectively, at opposite ends, respectively, of the stroke of piston 118.

A trip member 242 secured to the piston rod 73 of the piston 70 serves to trip the limit switches 240 and 241 at opposite ends of the stroke of the piston 70.

A trip member 247 on the piston rod 102 of one of the pistons 100 serves to trip the limit switches 245 and 246, respectively, at opposite ends of the stroke of this piston 100, respectively.

A trip member 251 on the piston rod 102 of the other piston 100 serves to trip the limit switches 252 and 253, respectively, at opposite ends of the stroke of this other piston 100.

A trip member 262 on the piston rod 264 of the piston 108 serves to trip the limit switches 260 and 261, respectively, at opposite ends of the stroke of the piston 108.

Trip members 265 carried by the piston rods 268 of the pistons 83 serve to trip the limit switches 266 and 267, respectively, at opposite ends of the strokes of the pistons 83.

One of the hydraulic motors 80 has a trip member 280 connected to its swash plate to trip limit switches 281, 282, and 283 in its movement, respectively. The other motor 80 has a trip member 285 secured to it to trip the limit switches 286, 287 and 288, respectively, in its movement.

The piston 108' trips through trip member 290, which is secured to the piston rod 294, the limit switches 291 and 292, respectively, at opposite ends, respectively, of the stroke of this piston 108'.

Figure 7:
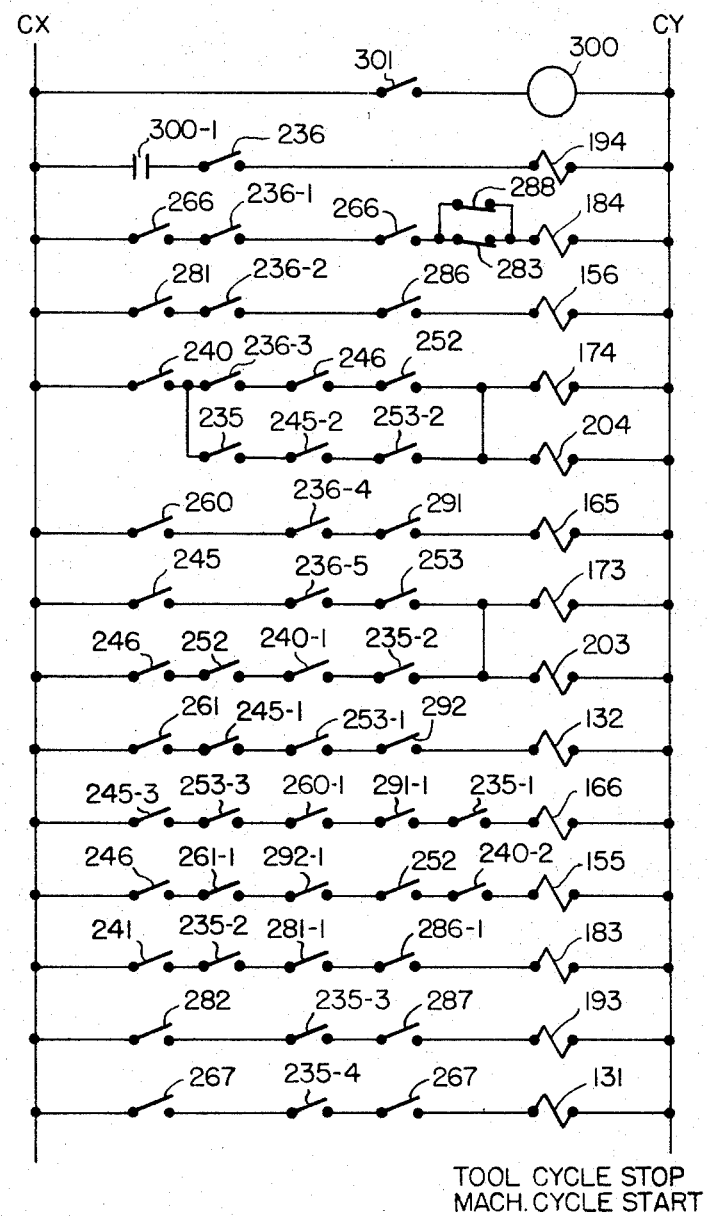
FIG. 7 is an electrical diagram illustrating one way in which the mechanism may be wired to achieve its purpose.

One way in which the tool changing mechanism may be wired to accomplish its purpose is shown in FIG. 7, wherein the energizing sequence of the above-noted valve-operating solenoids is illustrated diagrammatically.

When the cutting cycle is completed, the tool pins or fingers 110 are in their withdrawn positions and the blocks 104 are adjacent one another, and the clamp sockets 81 are in their withdrawn positions, and the carriage 84 is in its lowered position where trip member 237 holds closed the switch contacts 236, 236-1, 236-2, 236-3, 236-4 and 236-5. The relay coil 300 is then momentarily energized through closing of switch 301 which connects coil 300 to the lines CX and CY. This closes relay switch contacts 300-1 and causes the solenoid 194 to be energized. This shifts the valve 192 (FIG. 8), which causes the pistons 83 to move forwardly closing limit switches 266 by operation of trip members 265 carried by these pistons 83; and it causes the wrenches 81 (FIG. 6) to move in to engage the screws 48.

The switches 266 close a circuit to the solenoid 184 (FIGS. 7 and 8) through now-closed switches 236-1, 283 and 288; and that solenoid is energized. This shifts the spring-centered valve 182 to actuate the hydraulic motors 80. The limit switches 281 and 286 are then permitted to close, and switches 282 and 287 are opened, by the arms 280 and 285, respectively, which are moved away from these switches by the hydraulic motors. The rotation of arms 280 and 285 continues until trips 280 and 285 open switches 283 and 288, and operates to unscrew the clamp screws sufficiently to release the clamps 45. Closing of switches 281 and 286 energizes solenoid 156, causing valve 154 (FIG. 8) to be shifted. This causes piston 70 to engage and move rack 52 (FIGS. 4, 5 and 6), to rotate pin 46 and close limit switch 240 (FIG. 8).

Rotation of pin 46 releases the tool blocks. Since carriage 84 is lowered and switches 246 and 252 are closed by trips 247 and 251, closing of limit switch 240 causes solenoids 174 and 204 to be energized, and causes valves 172 and 202 to be shifted to move pistons 108 and 108' inwardly to close limit switches 260 and 291. The movement of these pistons causes pins or fingers 110 to enter the holes 116 in the tool blocks, ready to pick up these blocks.

The closing of switches 260 and 291 energizes solenoid 165. This shifts valve 162 to move pistons 100 and tool blocks 32 apart. At the ends of their strokes in this direction the tool blocks are disposed in carriage pockets 109, and the trips 247, 251 carried by the pistons 102, 102' close switches 245 and 253, respectively.

This causes solenoids 173 and 203 to be energized to shift valves 172 and 202, respectively, back to their original positions (FIG. 8) and causes shift of pistons 108 and 108', respectively, back to their original positions. The two pins or fingers 110 are therefore withdrawn from the tool blocks.

Shifting of pistons 108 and 108' causes limit switches 261 and 292 to be closed again. At this time switches 245-1 and 253-1 are still held closed by trips 247 and 251, so that solenoid 132 becomes energized. This shifts valve 130 from the position shown in FIG. 8 and causes piston 118 to elevate the tool holder carriage 84 to place into registry with the now-empty grooves 33 in the ram shanks 30 a new set of tool blocks 32, which had been loaded into the carrier pockets 111 during the preceding machining cycle.

The upward movement of piston 118 closes the several contacts of limit switch 235 to reenergize solenoids 174 and 204 through switches 245-2 and 253-2 so that fingers 110 are advanced into openings 116 in the new blocks in pockets 111 preparatory to cycling the loading of new tool blocks into the tool shank. This closes switches 260-1 and 291-1 energizing the solenoid 166 thereby shifting the valve 162 back to the position shown in FIG. 8 to cause release of switches 245 and 253 and closing of switches 246 and 252 through movement of pistons 100. The blocks 104 are thus moved toward one another.

The closing of switches 246 and 252 reenergizes the solenoids 173 and 203 through now-closed switches 240-1 and 235-2, thereby retracting fingers 110 and closing switches 261-1 and 292-1 completing a circuit to solenoid 155 through now-closed switches 246, 252 and 240-2. This shifts valve 154 to cause piston 70 to be moved back to the position shown in FIG. 8. This causes rotary pin 46 and keys 56 to return to locking position with respect to the tool blocks, and also releases limit switch 240 and closes limit switch 241.

The closing of limit switch 241 energizes solenoid 183, through now-closed switch contacts 235-2, 281-1 and 286-1. The motors 80 are thus actuated to tighten the screws 48 (FIGS. 4 and 5) and clamp the tool blocks in position. Switches 282 and 287, which are thus released, close a circuit to solenoid 193. This shifts valve 192 back to the position shown in FIG. 8, and causes pistons 83 to withdraw the wrenches 81 (FIG. 6) from the heads of the screws 48.

The pistons 83 close switches 267 again. This energizes solenoid 131 again and shifts valve 130 back to the position shown in FIG. 8, causing piston 118 (FIG. 6) to drop the carriage 84 back to its lowered or starting position, where it remains until switch 301 is once again closed.

When the rams have moved back toward the work, the operator can easily remove the old tools from pockets 109 of the tool holder carriages and insert new tools into pockets 111 for the next tool change. These loading and unloading operations may be performed manually or automatically.

While the invention has been described in connection with a specific embodiment thereof, it will be understood that it is capable of further modification and this application is intended to cover any modifications of the invention coming within its scope or the limits of the appended claims.

Having thus described my invention, what I claim is:

1. In a machine tool having aframe, and a support movable on said frame into and out of a tool changing position, the combination of a pair of tool blocks mounted on said support, means on said support for clamping the two tool blocks thereon, means on said frame registrable with said clamping means, when said support is in tool changing position, for moving said clamping means to and from clamping position, transfer means engageable with said two tool blocks, when said clamping means has been unclamped, means operative, upon engagement of said transfer means with said two tool blocks, to move said tool blocks apart to remove said tool blocks from said support, and means for automatically disengaging said transfer means from said tool blocks upon predetermined movement of said blocks away from one another.

2. In a machine tool, the combination claimed in claim 1, wherein said support has a seat for each tool block, and said clamping means includes a clamping member and screws for securing said clamping member in clamping position on said support, and a rotary bar on said support which is pressed by said clamping member, upon movement of said clamping member to clamping position, into engagement with said blocks to force both said tool blocks onto their seats.

3. In a machine tool, the combination claimed in claim 2, wherein each of said tool blocks has a projection thereon, said support has two grooves therein to receive said projections, said seats are right-angular surfaces opening on said grooves, said projections have right-angular surfaces matching the right-angular surfaces in said grooves, and said bar, when pressed by said clamping member, forces the right-angular surfaces on both tool blocks simultaneously onto said right-angular surfaces of said two grooves.

4. The combination with a boring machine having a crossrail, a saddle reciprocable thereon into and out of a tool changing position adjacent one end of said crossrail, a tool ram dependent from said saddle, and releasable tool clamping means for releasably securing a tool block to the shank of said ram, of a plurality of tool blocks and a changer therefor, comprising a frame positioned adjacent one side of said machine, a carriage movably mounted on said frame and having therein a pair of spaced tool pockets for supporting therein a pair of tool blocks, one of said pockets normally being empty and disposed to register with the block in said shank, when said saddle is moved to its tool changing position, and the other of said pockets being disposed to carry a new tool block therein, movable releasing means on said frame operative, upon movement of said saddle to a tool changing position, to move from a first to a second position to engage and release said tool clamping means, movable transfer means on said frame operative, upon release of said clamping means, to transfer the released tool block from said shank to the empty pocket in said carriage, means operative upon transfer of said released block to said empty pocket to shift said carriage from a first to a second position to place the other of said pockets into registry with said shank, means operative, upon registry of said other pocket with said shank, to actuate said transfer means to effect transfer of said new tool block from said other pocket to said shank, and means operative, upon transfer of said new tool block to said shank, to move said releasing means from its second to its first position to move said clamping means to clamping position to secure said new tool block to said shank.

5. The combination as defined in claim 4, including means operative, when said new tool block is secured to said shank to actuate said carriage shifting means to shift said carriage back to its first position.

6. The combination as defined in claim 4, wherein said transfer means comprises a first member mounted on said frame for reciprocation between first and second positions, a finger mounted on said first member to reciprocate in a direction transverse to the movement of said first member into and out of an opening in the tool block that is to be transferred, and means for advancing said finger into said opening in a tool block prior to each movement of said first member from one to the other of its limit positions and for retracting said finger from the last-named opening at the termination of the last-named movement of said first member.

7. The combination as defined in claim 4, wherein a pair of said tool blocks are slidably inserted into, and retractable out of a pair of spaced, aligned grooves formed in opposite sides, respectively, of said ram shank, said carriage is mounted for reciprocation on said frame and has thereon a pair of spaced arms each having therein a pair of said spaced tool pockets for registry, selectively, with one of said grooves, and said clamping means comprises a bar rotatable in said shank into and out of a locking position in which it secures said pair of blocks against lateral movement in said shank, a pair of clamping members releasably secured by a pair of screw members to said shank to engage and press opposite ends of said bar radially into clamping engagement with said pair of blocks, and a reciprocable rack member projecting at one end from said shank and drivingly engaged with said bar to rotate the latter into and out of its locking position.

8. The combination as defined in claim 7, wherein said releasing means comprises
- a pair of screw releasing members movably mounted on said frame, and
- means operative upon movement of said saddle to its tool changing position successively to advance said screw releasing members into engagement with said screw members and to rotate said screw members in directions to release said clamping members.

9. The combination as defined in claim 8, wherein said releasing means further comprises
- a reciprocable actuator mounted on said frame, and
- means operative upon release of said clamping members successively to advance said actuator into coupling engagement with said one end of said rack member, and to retract said actuator to draw said rack member in a direction to effect rotation of said bar out of its locking position.

10. The combination as defined in claim 9, wherein said transfer means comprises
- a pair of transfer members mounted on said frame to reciprocate into and out of starting positions in which they are disposed adjacent said shank, when the latter is moved to its tool transfer position,
- a pair of reciprocable fingers on said transfer members,
- means operative upon retraction of said actuator to move said fingers into registering openings in the two tool blocks in said shank, and
- means operative upon insertion of said fingers in said blocks to move said transfer members toward said carriage arms to cause said fingers to shift said blocks from said grooves in said shank to the registering pockets in said carriage arms.

* * * * *